3,082,194
ALCOHOLYSIS OF CROSS-LINKED VINYL ESTER POLYMER

Primo Imperiale and Adriano Cella, Villadossola, Italy, assignors to Rhodiatoce S.p.A., Milan, Italy
No Drawing. Filed Jan. 27, 1959, Ser. No. 789,233
Claims priority, application Italy Oct. 23, 1958
3 Claims. (Cl. 260—91.3)

This invention relates to the total or partial alcoholysis of polyvinyl esters and their copolymers containing over 50% polyvinyl esters. Total or partial alcoholysis of these compounds yields homo- or copolymers, respectively, of vinyl alcohol or its partial esters, which are well-known and of considerable importance in industrial use.

The above compounds are industrially prepared by various methods, mostly based on alcoholysis, sometimes on hydrolysis of polyvinyl esters and their homo- or copolymers in the presence of alkaline or acid catalysts.

In conventional methods alcoholysis is carried out by employing the smallest possible quantity of solvents for the homo- or copolymeric polyvinyl ester. On account of this fact and of the insolubility of the reaction product in the existing liquid phase, the reaction mass goes over a highly viscous sticky gel phase which makes it difficult to control the reaction, necessitates heavy stirring equipments and entails high power consumption.

Still according to conventional methods hydrolysis, which is generally carried out by means of acid catalysts, yields homo- or copolymers of vinyl alcohol or its partial esters in the form of a solution containing large quantities of the acid or acids formed in the course of alcoholysis of the vinyl ester or esters. This solution should in any case be freed from the acid or acids through lengthy expensive distillations or neutralization which necessitates a subsequent expensive purification of the end product from the salts formed therein.

Where polyvinyl alcohols or its homo- or copolymer partial esters should be obtained in a solid condition as in most cases, the solution should be evaporated to dryness or treated by means of agents precipitating the homo- or copolymers of polyvinyl alcohol or its partial esters, the said processes being likewise lengthy and expensive and liable to alter the characteristics (properties) of the product.

In order to overcome the abovementioned difficulties various measures are usually adopted in alcoholysis or hydrolysis, examples of which are given hereafter.

Alcoholysis is carried out in the presence of a non-solvent for the starting product and a poor solvent therefor, both being chemically nonreactive, mostly in the presence of a hydrocarbon which acts as a dispersing agent for the gel (U.S. Patent 2,502,715 of April 4, 1950, and 2,605,259 of July 29, 1952; British Patent No. 749,458 of May 23, 1956);

Alcoholysis is carried out by pouring the reaction mixture before its reaching its gel phase on a conveyor band or equivalent apparatus and subdividing the gel at the end of the band travel (U.S. Patent No. 2,642,419 and 2,642,420 of June 16, 1953, 2,643,994 of June 30, 1953);

Alcoholysis is effected by pumping the reaction mixture before it reaches its gel phase to a ball-mill in which the gel is finely subdivided (U.S. Patent No. 2,779,752 of January 29, 1957);

Hydrolysis is carried out in the presence of an agent which makes the end product water-insoluble and may thereafter be removed by washing (U.S. Patent No. 2,783,218 of February 26, 1953);

Hydrolysis is effected in the presence of alcohol in a quantity large enough to fully esterify the acid or acids set free, the ester or esters being distilled off as they are formed (German Patent No. 895,920 of November 9, 1953).

This invention provides a novel method for obtaining in a simple, speedy, inexpensive manner homo- or copolymers of vinyl alcohol or its partial esters as pure homogeneous products distinguishing by a rapid full solubleness in water or usual solvents at moderate or raised temperatures, clear colourless solutions being formed.

The main feature of the improved method consists in employing for alcoholysis a homo- or copolymer polyvinyl ester which has been conveniently reticulated in order to make it:

Insoluble in ordinary solvents;

Capable of swelling and suitable for alcoholysis in the said solvents without any alteration of its initial physical form.

According to an embodiment of this invention a homo- or copolymer polyvinyl ester which has been conveniently reticulated is subjected to alcoholysis in the presence of a swelling agent and alcoholysis catalyst, at a temperature ranging between 20° and 60° C. while stirring the reaction mass, the alcoholysis treatment being, if convenient, stopped at the desired moment, by admixture of a catalyst neutralizing agent, the liquid phase of the reaction mass being conveniently separated from its solid phase, the alcoholysis product being washed and dried at a temperature ranging between 30° and 60° C., the solvents being recovered if desired.

By this improved process the physical form of the initial product which is mostly in the form of small balls or beads or, alternatively, of tiny irregular fragments does not alter, the said form being transmitted as such to the end product.

The above affords the following advantages:

Saving of time, heat and mechanical power required by ordinary methods of dissolving the starting product;

The reaction mixture need not go through the highly viscous sticky gel phase, which facilitates checking the reaction, avoids heavy stirring equipments and minimizes power consumption;

Avoiding the highly viscous sticky gel phase makes possible part or full alcoholysis of polyvinyl esters and their copolymers of high molecular weight by the use of small quantities of swelling agents;

The quantity of product adhering to equipments, hence the losses of product and time for cleaning, are minimized;

The product can be separated from the reaction liquid and dried much easier and more economically than in a condition of a more or less fine powder in which it is presently currently prepared;

The product is easier and more economical in packing and use with respect to conventional more or less finely pulverized types through the absence of dust;

The product is easier and more economical in packing, storing and transport with respect to conventional more or less finely pulverized types, through its higher apparent specific gravity.

As distinct from conventional methods, more particularly the methods disclosed by the abovementioned patents, all the abovementioned advantages can be obtained:

Without employing dispersing agents for the gel, which are liable to contaminate or at any rate complicate the recovery cycle of the reaction liquids;

Without modifying or changing conventional equipments;

Without employing insolubilizing agents for the final products, thereby avoiding subsequent purification steps.

Further advantages of the method and specific features of the product will be understood from the appended description.

In practicing the improved method stirring is required during alcoholysis because the swollen particles are somewhat tacky and this characteristic, in the absence of stirring would lead to the formation of gelatinous clots which could hardy be broken. The resistance opposed by the swollen particles against stirring is very low thus requiring a minimum force.

The improved method can be employed for partial or complete alcoholysis of polyvinyl esters and copolymers thereof, of any molecular weight, prepared for polymerization in the presence of suitable quantities of the following reticulating agents:

Polyfunctional monomers containing 2 or a plurality of double-bonds carbon-carbon are employed as reticulating agents for polyvinyl esters or copolymers thereof;

Alcohols alone or jointly in various proportions with the esters formed on alcoholysis, or, if desired, with further non-solvent or practically non-solvent products for the final product (such as aliphatic hydrocarbons, acetone, benzene) are employed as swelling agents for polyvinyl esters or copolymers thereof;

Hydroxides, such as sodium or potassium hydroxide, alkaline alcoholates such as sodium or potassium methylate, inorganic acids, such as sulphuric or hydrochloric acid, organic acids, such as sulpho-acids are employed as alcoholysis catalysts;

Operation is carried out at temperatures ranging between 20 and 60° C.

The steps and operational conditions of the improved method are as follows:

Preparation of homo- or copolymer reticulated polyvinyl ester such as in bead form by any of the known polymerizing methods. The dose of reticulating agent may vary between 0.02 and 50 moles, preferably 0.1 and 10 moles to 1000 moles of monomer;

Preparation of the alcoholysis mixture containing to each monomer mole 1–10 moles, preferably 3–8 moles swelling agent;

Admixture of 0.003–1 mole, preferably 0.005–0.1 mole alcoholysis catalyst to each mole monomer;

Alcoholysis is carried out at 20–60° C. while stirring. After 5–60 minutes the solid phase swell fully absorbing the liquid phase, without the particles losing or altering their initial physical form. After 0.1–10 hours syneresis starts. After the time period required for reaching the desired degree of alcoholysis has elapsed, which period can be determined through a set of experimental tests, reaction is stopped by admixture of a suitable quantity of a neutralizing agent for the acid catalyst (such as an alcoholic solution of sodium or potassium hydroxide) or for the alkaline catalyst (such as formic or acetic acids);

Separation of the liquid phase from the solid phase mostly by centrifuging and washing of the product by small quantities of an alcohol, mostly methyl alcohol;

Drying of the product at moderate temperature (30–60° C.) by any of the conventional methods and recovery of the solvent.

Examples are given hereafter of the use of this invention, which should not however, be understood to limit its field of application.

The equipment employed for carrying out the tests described in the examples comprises a conventional container of glass or stainless steel, capable of thermostatic adjustment, equipped with a mechanical stirrer, temperature gage, reflux cooler.

EXAMPLE 1

*Alkaline alcoholysis of a polyvinyl acetate of high molecular weight for obtaining a polyvinyl alcohol of 98–100% hydrolysis ratio*

A four-necked 2500 ml. flask immersed in a water bath fitted with a mechanical stirrer, temperature gage from 0 to 100° C., reflux cooler, is filled at room temperature with 1200 g. methanol in which 4 g. potassium hydroxide have been dissolved. 400 g. polyvinyl acetate reticulated by 0.3 mole divinyl adipate to 1000 moles vinyl acetate is rapidly admixed. After 30 minutes the beads swell owing to almost full absorption of methanol. Stirring is started at about 100 r.p.m. After 3 hours syneresis starts and after 2 further hours reaction is stopped by bringing the reaction mixture to pH 7 by admixture of formic acid. The product is centrifuged, washed by methanol and dried. It is in the form of regular beads of uniform diameter slightly smaller with respect to the starting polyvinyl acetate, translucid or slightly yellow, which flows freely. The product is insoluble in cold water, soluble in hot water. Its 4% solution is of a viscosity at 20° C. of 50–60 cp.

EXAMPLE 2

*Alkaline alcoholysis of a polyvinyl acetate of medium molecular weight for obtaining a polyvinyl alcohol of 98–100% hydrolysis ratio*

The equipment, operational conditions and progress of reaction are similar as described in Example 1. The reactor is filled with 1200 g. methanol in which 6 g. potassium hydroxide has been dissolved. 400 g. polyvinyl acetate reticulated by 2 moles divinyl adipate to 1000 moles vinyl acetate is rapidly admixed. The reaction takes about 3 hours. The resulting product is in the form of beads fully similar to those obtained in Example 1; it is insoluble in cold water, easily soluble in water at temperatures over 50° C. Its 4% watery solution is of a viscosity at 20° C. of 5–6 cp.

EXAMPLE 3

*Alkaline alcoholysis of a polyvinyl acetate of high molecular weight for obtaining a polyvinyl alcohol of about 90% hydrolysis ratio*

The equipment, operational conditions and progress of reaction are similar as described in Example 1. Charge of the reactor: 1200 g. methanol in which 2 g. potassium hydroxide has been dissolved; 400 g. polyvinyl acetate reticulated by 0.25 mole divinyl adipate to 1000 moles vinyl acetate.

After about 3 hours the reaction is stopped by neutralizing by means of formic acid.

The product is similar in appearance to the product obtained according to Example 1, is soluble in cold water and much more rapidly soluble in the hot. Its 4% solution is of a viscosity at 20° C. of 60–70 cp.

EXAMPLE 4

*Alkaline alcoholysis of a polyvinyl acetate of medium molecular weight for obtaining a polyvinyl alcohol of about 90% hydrolysis ratio*

The apparatus, operational conditions and progress of reaction are similar as described in Example 1.

The reactor is filled with 1200 g. methanol in which 3.2 g. potassium hydroxide has been dissolved; 400 g. polyvinyl acetate reticulated by 2 moles divinyl adipate to 1000 moles vinyl acetate.

After about 3 hours the reaction is stopped by neutralizing by means of formic acid.

The product is similar in appearance to the product obtained in Example 1; it is soluble in cold water; and more rapidly soluble in hot water. Its 4% solution is of a viscosity at 20° C. of 6–7 cp.

EXAMPLE 5

*Acid alcoholysis of a polyvinyl acetate of high molecular weight for obtaining a polyvinyl alcohol of 98–100% hydrolysis ratio*

The equipment is similar as described in Example 1.

The reactor is filled at room temperature with 1200 g. methanol admixed with 20 g. concentrated sulphuric acid and 400 g. polyvinyl acetate reticulated by 1 mole divinyl adipate to 1000 moles vinyl acetate, whereupon stirring is started at about 150 r.p.m. After about 1 hour the beads have almost fully absorbed methanol. Heating is then started, the water bath being raised to about 60° C. After 7-8 hours from the beginning of the treatment the beads start separating the solvent; after further 4-5 hours reaction is completed. The end product can be neutralized by adding a solution of sodium hydroxide in methanol.

The resulting beads are slightly tinged in yellow, insoluble in cold water, soluble in hot water. The 4% watery solution is at 20° C. of a viscosity of about 40 cp.

According to this invention the following products can be obtained:

Polyvinyl alcohols highly soluble in water yielding clear colourless solutions;

Polyvinyl alcohols of very high viscosity sharply exceeding by absolute value the maximum viscosities obtainable by operating along conventional methods;

A slightest variation in the reticulating agent quantity yields polyvinyl alcohols distinguishing by a wide range of viscosity.

A peculiar property of polyvinyl alcohols obtained according to this invention resides in the fact that their viscosity is higher the lower is the hydrolysis ratio (within the range 80-100%), as distinct from polyvinyl alcohols obtained by conventional methods.

What we claim is:

1. In the process for producing vinyl alcohol polymers by the alcoholysis of a copolymer of a polyvinyl ester of a carboxylic acid in particulate form in an alcoholic liquid medium containing an alcoholysis catalyst while stirring, thereby to convert polyvinyl ester copolymer particles into polyvinyl alcohol particles, and recovering the latter from the liquid medium, said ester being normally soluble in said medium, the improvement consisting of employing for the alcoholysis a copolymer of a polyvinyl ester of a carboxylic acid in particulate form produced by reacting in particulate form the corresponding vinyl ester monomer with 0.02 mole to 50 moles per 1,000 moles of monomer of a cross-linking agent consisting of a polyfunctional monomer having at least two pairs of double-bonded carbon atoms in its molecular structure, whereby to render the ester polymer particles swellable only and substantially insoluble in the alcoholic liquid medium, and carrying out said alcoholysis at a temperature between 20° C. and 60° C. in the presence of 0.003 mole to 1 mole of the alcoholysis catalyst referred to each mole of monomer.

2. In the process for producing vinyl alcohol polymers by the alcoholysis of a copolymer of a polyvinyl ester of a carboxylic acid in particulate form in an alcoholic liquid medium containing an alcoholysis catalyst while stirring, thereby to convert polyvinyl ester copolymer particles into polyvinyl alcohol particles, and recovering the latter from the liquid medium, said ester being normally soluble in said medium, the improvement consisting of employing for the alcoholysis a copolymer of a polyvinyl ester of a carboxylic acid in particulate form produced by reacting in particulate form the corresponding vinyl ester monomer with .02 mole to 50 moles per 1,000 moles of monomer of a cross-linking agent consisting of divinyl adipate, whereby to render the ester polymer particles swellable only and substantially insoluble in the alcoholic liquid medium, and carrying out said alcoholysis at a temperature between 20° C. and 60° C. in the presence of 0.003 mole to 1 mole of the alcoholysis catalyst referred to each mole of monomer.

3. In the process for producing vinyl alcohol polymers by the alcoholysis of a copolymer of a polyvinyl ester of a carboxylic acid in particulate form in a liquid medium containing methanol as alcoholysis agent and an alcoholysis catalyst while stirring, thereby to convert polyvinyl ester copolymer particles into polyvinyl alcohol particles, and recovering the latter from the liquid medium, said ester being normally soluble in said medium, the improvement consisting of employing for the alcoholysis a copolymer of a polyvinyl ester of a carboxylic acid in particulate form produced by reacting in particulate form the corresponding vinyl ester monomer with .02 mole to 50 moles per 1,000 moles of monomer of a cross-linking agent consisting of divinyl adipate, whereby to render the ester polymer particles swellable only and substantially insoluble in the alcoholic liquid medium, and carrying out said alcoholysis in said liquid medium containing methanol in the proportion of 1 mole to 10 moles per 1 mole of monomer at a temperature between 20° C. and 60° C. in the presence of 0.003 mole to 1 mole of the alcoholysis catalyst referred to each mole of monomer.

References Cited in the file of this patent

UNITED STATES PATENTS

| | | |
|---|---|---|
| 2,611,762 | Luce | Sept. 23, 1952 |
| 2,700,035 | Bristol | Jan. 18, 1955 |
| 3,005,809 | Lowell et al. | Oct. 24, 1961 |